US007690548B2

(12) United States Patent  (10) Patent No.: US 7,690,548 B2
Mlinar et al.  (45) Date of Patent: Apr. 6, 2010

(54) APPARATUS OF ADJUSTING THE POSITION OF AN ULTRASONIC WELDING HORN

(75) Inventors: John R. Mlinar, Coon Rapids, MN (US); Donald S. Oblak, North St. Paul, MN (US); Paul M. Fettig, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 697 days.

(21) Appl. No.: 11/321,265

(22) Filed: Dec. 29, 2005

(65) Prior Publication Data

US 2006/0144904 A1 Jul. 6, 2006

Related U.S. Application Data

(60) Provisional application No. 60/640,979, filed on Jan. 3, 2005.

(51) Int. Cl.
B23K 1/06 (2006.01)
B29C 65/00 (2006.01)
B29C 65/08 (2006.01)

(52) U.S. Cl. .................. 228/1.1; 228/110.1; 156/358; 156/580.1

(58) Field of Classification Search .............. 228/1.1, 228/110.1–111.5; 156/555, 580.2, 582, 358, 156/64, 580.1, 173.1
See application file for complete search history.

(56) References Cited

U.S. PATENT DOCUMENTS

| 4,553,461 | A | * | 11/1985 | Belongia ................. 83/344 |
| 4,701,240 | A | * | 10/1987 | Kraemer et al. ........... 156/555 |
| 5,431,324 | A | * | 7/1995 | Kajiwara et al. .......... 228/102 |
| 5,552,013 | A | * | 9/1996 | Ehlert et al. ............. 156/555 |
| 5,562,790 | A | * | 10/1996 | Ehlert et al. ............. 156/73.1 |
| 5,876,530 | A | * | 3/1999 | Seki et al. ............... 156/64 |
| 6,164,360 | A | * | 12/2000 | Watrinet et al. .......... 156/555 |
| 6,168,063 | B1 | * | 1/2001 | Sato et al. ............... 228/1.1 |
| 6,287,403 | B1 | * | 9/2001 | Couillard et al. ......... 156/73.1 |
| 6,508,641 | B1 | | 1/2003 | Kubik |

(Continued)

FOREIGN PATENT DOCUMENTS

EP 0 689 930 A2 1/1996

(Continued)

OTHER PUBLICATIONS

Sherrit et al. Novel Horn Designs for Ultrasonic/sonic Cleaning, Welding, Soldering, Cutting, and Drilling, Mar. 2002, Proceedings of the SPIE Smart Structure Conferences, vol. 4701, paper No. 34.*

*Primary Examiner*—Jessica L. Ward
*Assistant Examiner*—Carlos Gamino
(74) *Attorney, Agent, or Firm*—Daniel R. Pastirik

(57) ABSTRACT

An ultrasonic rotary welding apparatus and methods of using the same are disclosed. The ultrasonic welding device includes an ultrasonic horn and an anvil. The ultrasonic horn is constrained by a mounting system. The mounting system permits the horn to exhibit two degrees of freedom. The first degree of freedom permits translational motion in a direction perpendicular to the longitudinal axis of the horn. The second degree of freedom permits rotation about an axis perpendicular to both the longitudinal axis of the horn and the direction of translational motion.

7 Claims, 14 Drawing Sheets

U.S. PATENT DOCUMENTS

| | | | |
|---|---|---|---|
| 6,634,539 B2 * | 10/2003 | Mlinar et al. | 228/110.1 |
| 6,786,384 B1 * | 9/2004 | Haregoppa | 228/1.1 |
| 7,060,142 B2 * | 6/2006 | Yamamoto | 156/73.1 |
| 2002/0062903 A1 | 5/2002 | Couillard et al. | |
| 2003/0057259 A1 | 3/2003 | Mlinar et al. | |
| 2004/0026007 A1 * | 2/2004 | Hubert et al. | 156/64 |

FOREIGN PATENT DOCUMENTS

EP    1447204 A1 *  8/2004

* cited by examiner

APPARATUS OF ADJUSTING THE POSITION OF AN ULTRASONIC WELDING HORN

RELATED APPLICATIONS

This application claims priority from provisional application Ser. No. 60/640,979, entitled "METHOD OF ADJUSTING THE POSITION OF AN ULTRASONIC WELDING HORN," filed Jan. 3, 2005, which is incorporated herein by reference.

FIELD OF THE INVENTION

The present invention relates to ultrasonic welding, and more particularly to a system and device for adjusting the position of an ultrasonic welding horn in response to changing process conditions.

BACKGROUND

In ultrasonic welding (sometimes referred to as "acoustic welding" or "sonic welding"), two parts to be joined (typically thermoplastic parts) are placed proximate a tool called an ultrasonic "horn" for delivering vibratory energy. These parts (or "workpieces") are constrained between the horn and an anvil. Oftentimes, the horn is positioned vertically above the workpiece and the anvil. The horn vibrates, typically at 20,000 Hz to 40,000 Hz, transferring energy, typically in the form of frictional heat, under pressure, to the parts. Due to the frictional heat and pressure, a portion of at least one of the parts softens or is melted, thus joining the parts.

During the welding process, an alternating current (AC) signal is supplied to a horn stack, which includes a converter, booster, and horn. The converter (also referred to as a "transducer") receives the AC signal and responds thereto by compressing and expanding at a frequency equal to that of the AC signal. Therefore, acoustic waves travel through the converter to the booster. As the acoustic wavefront propagates through the booster, it is amplified, and is received by the horn. Finally, the wavefront propagates through the horn, and is imparted upon the workpieces, thereby welding them together, as previously described.

Another type of ultrasonic welding is "continuous ultrasonic welding". This type of ultrasonic welding is typically used for joining fabrics and films, or other "web" workpieces, which can be fed through the welding apparatus in a generally continuous manner. In continuous welding, the ultrasonic horn is typically stationary and the part to be welded is moved beneath it. One type of continuous ultrasonic welding uses a rotationally fixed bar horn and a rotating anvil. The workpiece is pulled between the bar horn and the anvil. The horn typically extends longitudinally towards the workpiece and the vibrations travel axially along the horn into the workpiece. In another type of continuous ultrasonic welding, the horn is a rotary type, which is cylindrical and rotates about a longitudinal axis. The input vibration is in the axial direction of the horn and the output vibration is in the radial direction of the horn. The horn is placed close to an anvil, which typically is also able to rotate so that the workpiece to be welded passes between the cylindrical surfaces at a linear velocity, which substantially equals the tangential velocity of the cylindrical surfaces. This type of ultrasonic welding system is described in U.S. Pat. No. 5,976,316, incorporated by reference in its entirety herein.

In each of the above-described ultrasonic welding techniques, the workpieces to be joined are disposed between the horn and the anvil, during the welding process. The gap between the horn and anvil creates a pinching force that holds and compresses the workpieces while they are being joined. The physical characteristics of the product generated by an ultrasonic welding process are, in part, a function of the gap between the horn and the anvil. Thus, for the manufacture of a given product, a particular gap is desired. Therefore, it is desired that a mounting system for an ultrasonic welding system allow for the horn to be adjustably positioned along a vector, so that the horn is either closer to, or further from, the anvil, depending upon the desired gap.

Further, in the context of continuous ultrasonic welding, the longitudinal axis of the horn should be substantially parallel to the longitudinal axis of the anvil. Such an arrangement generally ensures that the gap exhibited between the anvil and the horn is substantially constant along the length of the horn. Accordingly, it is further desired that a mounting system permit the longitudinal axis of the horn to be adjusted, so as to be substantially parallel with the longitudinal axis of the anvil.

Still further, because the physical characteristics of the product generated by an ultrasonic welding process are, in part, a function of the relative positions of the horn and the anvil, it is desirable that the mounting system substantially eliminates degrees of freedom of the horn and anvil not needed to either adjust the gap between the horn and the anvil or to bring the longitudinal axis of the horn into a parallel relation to the longitudinal axis of the anvil.

SUMMARY OF THE DISCLOSURE

An apparatus having reduced degrees-of-freedom available, to better control the gap between the anvil and the horn, is described. The apparatus generally includes a rotatable tool roll having a first axis. The apparatus also includes a mounting system for supporting the rotatable tool roll so that it can rotate about its first axis and such that the rotatable tool roll has only two additional degrees of freedom. The first additional degree of freedom is translational motion in a direction perpendicular to the first axis. The second additional degree of freedom being rotational motion about a second axis that is both perpendicular to the first axis and the direction of the first additional degree of freedom.

According to another embodiment, a method of treating a web of indefinite length includes providing a mounting system for supporting a rotatable tool roll so that it can rotate about its first axis and such that the rotatable tool roll has only two additional degrees of freedom. The first additional degree of freedom is translational motion in a direction perpendicular to the first axis. The second additional degree of freedom is rotational motion about a second axis that is both perpendicular to the first axis and the direction of the first additional degree of freedom. The method further includes mounting a rotatable tool roll having an first axis within the mounting system, and contacting the web with the tool roll so as to treat the web.

BRIEF DESCRIPTION OF THE DRAWINGS

In the several figures of the attached drawing, like parts bear like reference numerals, and.

DETAILED DESCRIPTION

As provided above, the present invention is directed to various improvements in ultrasonic welding and methods. The improvements can be used in conjunction with continuous ultrasonic welding or with rotary type ultrasonic welding having one or both of the anvil and the horn rotate. Overall, the improvements are directed to various configurations for better measuring, sensing, and controlling the gap and the movement between the horn and the anvil.

Various alternate embodiments are described below, having features that can be combined with other embodiments or used alone. For example, an apparatus having reduced degrees of freedom is described using a rotary ultrasonic apparatus, where both the anvil and horn are rotary. The features that provide the reduced degrees of freedom could likewise be incorporated into an apparatus where, for example, the horn is rotary and the anvil is stationary. As another example, a method for monitoring and adjusting the gap between the anvil and horn, using resonant frequency feedback, is described using a stationary apparatus, having both the horn and the anvil stationary. The features that monitor and adjust the gap could likewise be incorporated in a rotary apparatus. As yet another example, a method for fixing the gap between the anvil and horn is described using a stationary apparatus, having both the horn and the anvil stationary. The features that set the gap could likewise be incorporated in a rotary apparatus.

Simplified Schematic Diagram

Figure 18:
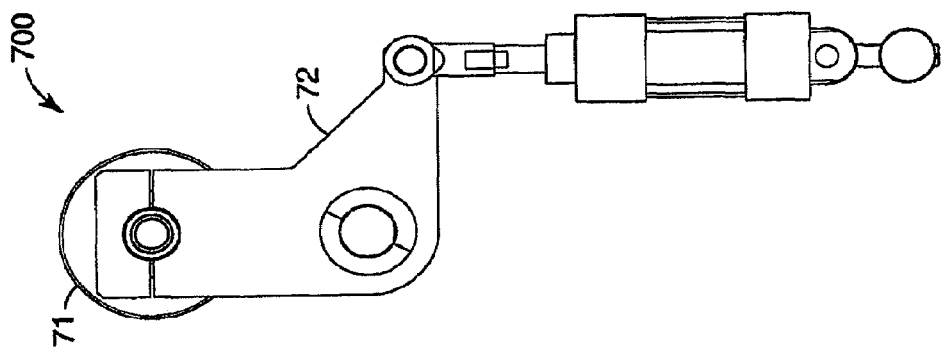
FIG. 18 is a side plan view of the nip sub-assembly of FIG. 17.
Figure 19:
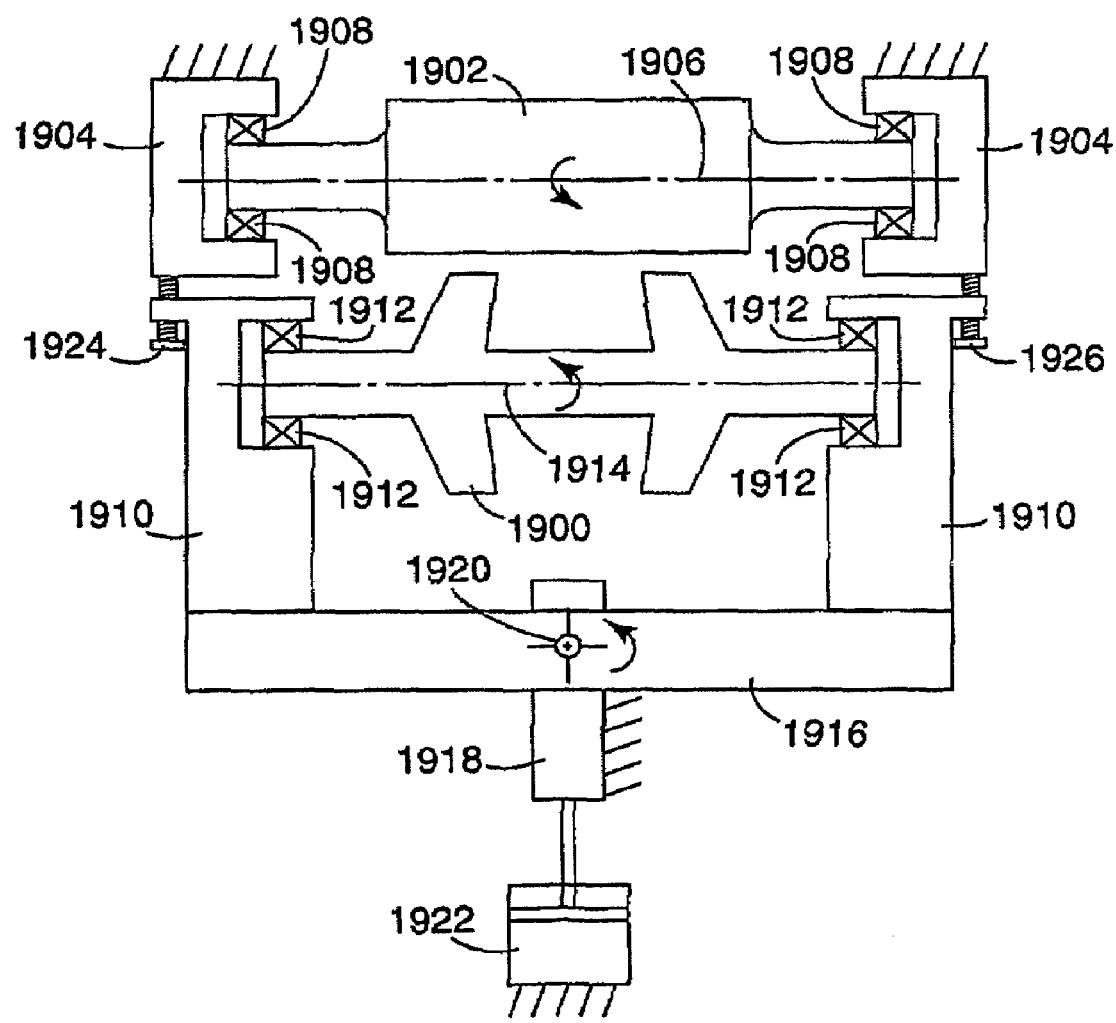
FIG. 19 depicts a simplified exemplary embodiment of a horn assembly.

FIG. 19 depicts a simplified embodiment of the mounting system depicted in FIGS. 1-18, below. The system of FIG. 19 omits details found in FIGS. 1-18, for the sake of providing a conceptual understanding of the system. The purpose of the discussion corresponding to FIG. 19 is to generally orient the reader to certain salient features of the mounting system without immersing the reader in the details presented in the discussion relating to FIGS. 1-18.

As can be seen from FIG. 19, the system includes a horn 1900 and an anvil 1902. A gap separates the horn 1900 from the anvil 1902. The anvil 1902 is mounted in a housing 1904 that is fastened to ground. The anvil 1902 is free to rotate about its longitudinal axis 1906, by virtue of ball bearings 1908 interposed between the anvil 1902 and the housing 1904. Other than the aforementioned rotation about its longitudinal axis 1906, the anvil 1902 exhibits no other degrees of freedom, due to being mounted within a structure fastened to ground.

The horn 1900 is mounted within a frame 1910. Ball bearings 1912 permit the horn to rotate about its longitudinal axis 1914. A linking member 1916 joins the two halves of the frame 1910. The linking member 1916 is attached to a translator 1918 by a pivot 1920. Thus, the frame 1910, linking member 1916, and horn 1900 may rotate about an axis defined by the pivot 1920 (the axis extends in and out of the page).

The translator 1918 is constrained by a structure fastened to earth, so that it exhibits a single degree of freedom: it may move along a vector perpendicular to the longitudinal axis 1906 of the anvil 1902. Thus, by virtue of being fastened to the translator 1918, the frame 1910, linking member 1916, and horn 1900 may move along the aforementioned vector. In other words, the horn 1900 (and frame 1910 and linking member 1916) may advance toward, or withdraw from, the anvil 1902.

An actuator 1922 imparts a force upon the translator 1918, so as to urge the horn 1900 toward the anvil 1902. The length of the gap between the horn 1900 and the anvil 1902 is controlled by a pair of threaded fasteners 1924, 1926, which extend through the horn's frame 1910 and engage the housing 1904 in which the anvil 1902 is mounted. Thus, by adjusting one threaded fastener 1924 or 1926, the frame 1910, linking member 1916, and horn 1900 are rotated about the aforementioned axis defined by the pivot 1920. Accordingly, by rotation of the threaded fasteners 1924 and 1926, the longitudinal axis 1914 of the horn 1900 may be adjusted, so as to be substantially parallel to that of the anvil 1902. Of course, by adjusting both threaded fasteners 1924 and 1926 in the same fashion, the horn 1900 may be advanced toward, or withdrawn from, the anvil 1902 without adjusting the angle of the horn 1900.

Thus, the mounting system of FIG. 19 permits only two degrees of freedom for positioning of the horn 1900. The horn 1900 may be advanced toward, or withdrawn from, the anvil 1902. This degree of freedom is permitted by virtue of coupling of the housing 1910 to the translator 1918, which is confined to motion in one direction. Further, the longitudinal axis 1914 of the horn 1900 may be rotated about an axis perpendicular to the longitudinal axis 1906 of the anvil 1902. This degree of freedom is permitted by virtue of the pivot 1920.

The various components of the system depicted in FIG. 19 functionally correspond to components found in the system depicted in FIGS. 1-18. The anvil 1902 corresponds to the anvil identified by reference numeral 21 in FIG. 2 and 3. The housing 1904 in which the anvil 1902 is mounted corresponds to the structures identified by reference numerals 24 and 25 in FIGS. 2 and 3 (i.e., the anvil 21 is mounted within the structures identified by reference numerals 24 and 25, thus making them analogous to the housing 1904 in FIG. 19).

Figures 10, 11:
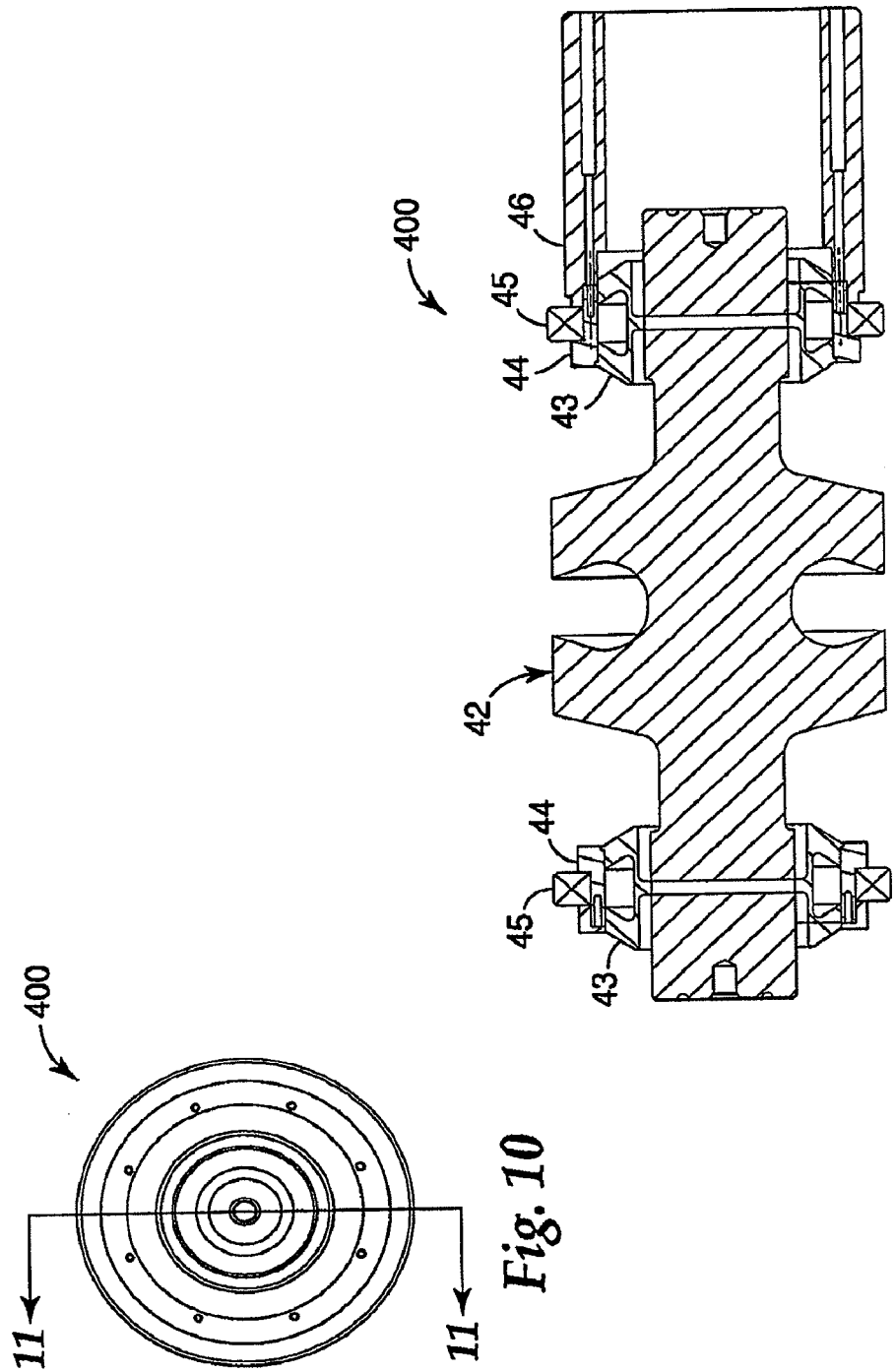
FIG. 10 is a front plan view of a horn assembly, which is held by horn mount sub-assembly of FIGS. 7 through 9.
FIG. 11 is a cross-sectional view of the horn assembly taken along line 11-11 of FIG. 10.

The horn 1900 corresponds to the horn identified by reference numeral 42 in FIG. 11. The frame 1910 in which the horn 1900 is mounted corresponds to the structure identified by reference numeral 32 in FIG. 7. Further, the linking member 1916 corresponds to the structure identified by reference numeral 31 in FIG. 7 (i.e., the structure identified by reference numeral 31 joins both halves of the frame 32, thus making it analogous to the linking member 1916). The ball bearings 1912 upon which the horn 1900 rides correspond to the nodal mount identified by reference numerals 43, 44, and 45 in FIG. 11 (i.e., the nodal mounts 43, 44, and 45 permit rotation of the horn 42, in a manner appropriate for a vibrating body. Despite the simplified depiction in FIG. 19, a vibrating body, such as a horn, would damage the ball bearings if riding thereupon. Hence, the need for nodal mount 43, 44, and 45.).

Figure 16:
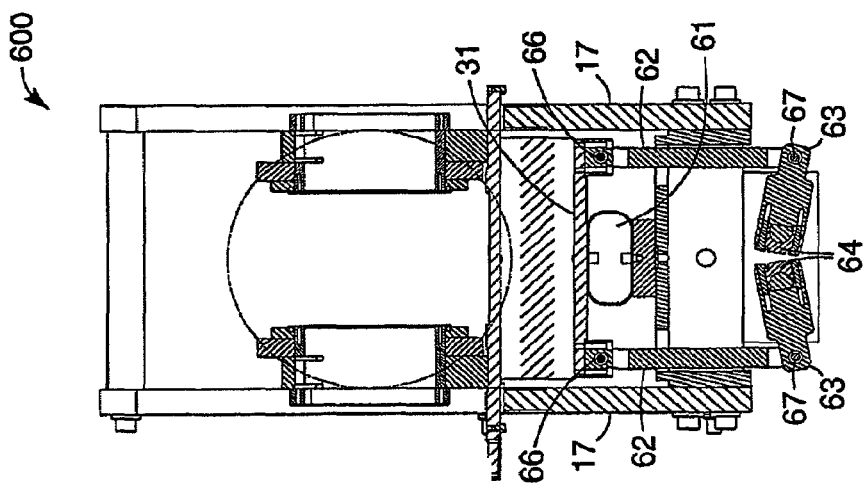
FIG. 16 is a cross-sectional view of the horn lift sub-assembly taken along line 16-16 of FIG. 15.
Figure 16A:
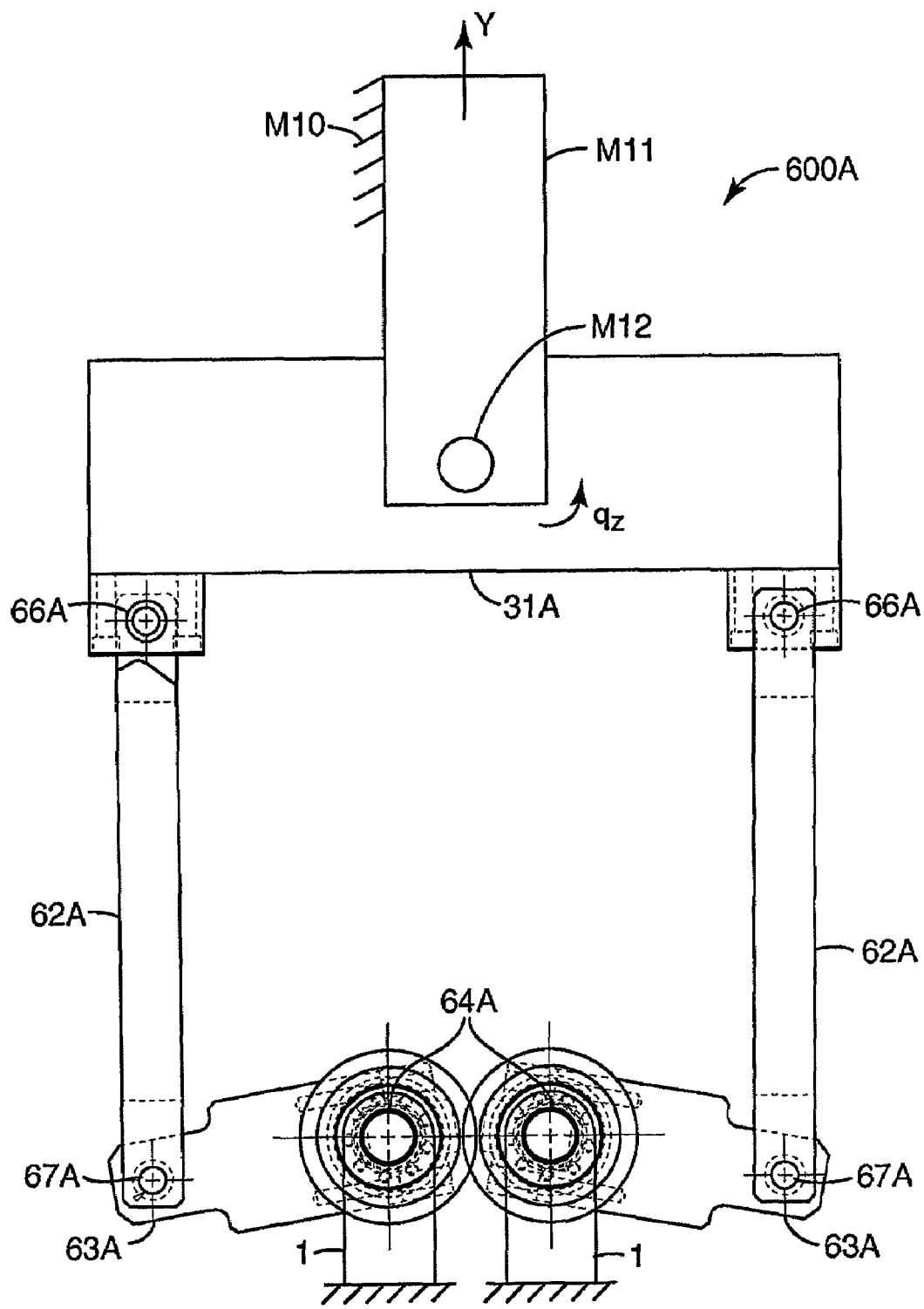
FIG. 16A is an alternate embodiment of a horn lift sub-assembly, similar to the view of FIG. 16.

The pivot 1920 corresponds to the pivot identified by reference numeral M12 in FIG. 16A. In other words, the pivot M12 permits rotation of the frame 32, and therefore rotation of the horn 42. Translator 1918 corresponds to translation member M11, also depicted in FIG. 16A. In other words, the frame 32 is joined to translation member M11, which is permitted one degree of freedom—it may advance toward or withdraw from the anvil 21. The actuator 1922 corresponds to the pneumatic bellows identified by reference numeral 61 in FIG. 14. In other words, the pneumatic bellows 61 generates a force to urge the translator M11 toward the anvil 21.

Figure 12:
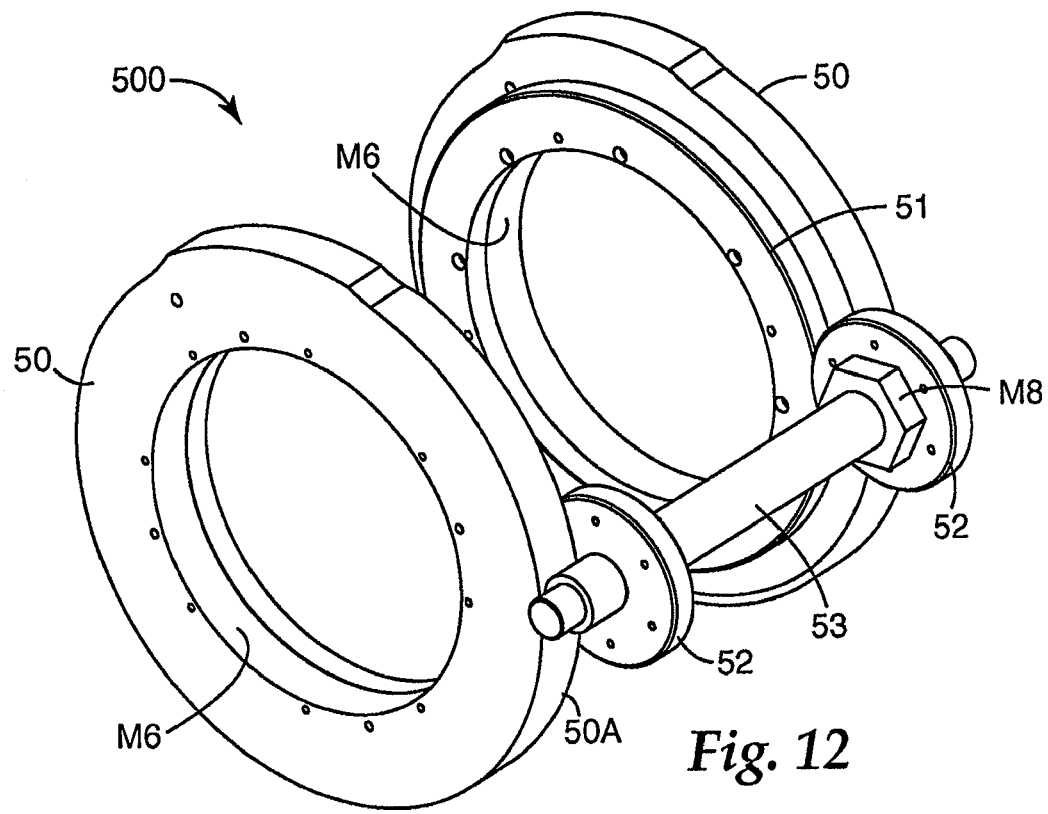
FIG. 12 is a perspective view of a horn-anvil gap adjustment sub-assembly of the apparatus of FIG. 1.
Figure 13:
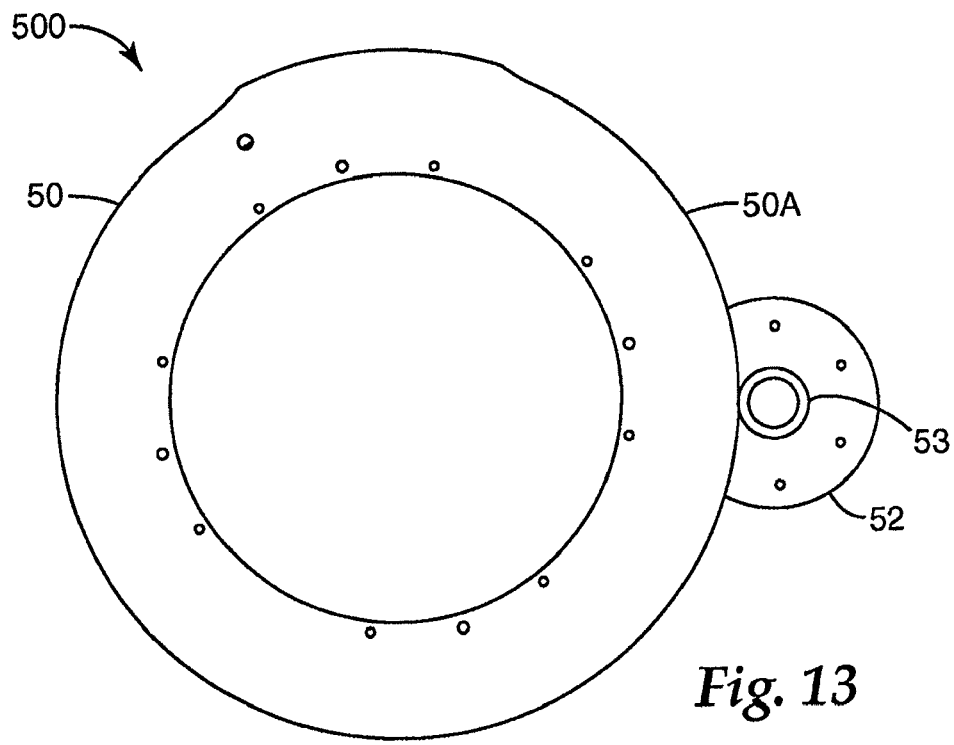
FIG. 13 is a side plan view of the horn-anvil gap adjustment sub-assembly of FIG. 12.

The threaded fasteners 1924 and 1926 correspond to the cams identified by reference numeral 50 in FIGS. 12 and 13. In other words, the cams 50 ride upon the cam followers 27 (shown in FIG. 3) attached to the frame 24, 25 in which the anvil 21 is mounted, and thereby alter the distance between the horn 42 and the anvil 21 and/or the orientation of the longitudinal axis of the horn 42 when rotated.

The remaining discussion with respect to FIGS. 1-18 pertains to disclosure of an exemplary embodiment of a system for mounting an ultrasonic welding device, as that system appears in view of all of its details and features.

Controlling Gap by Reduced Degrees of Freedom

Figure 1:
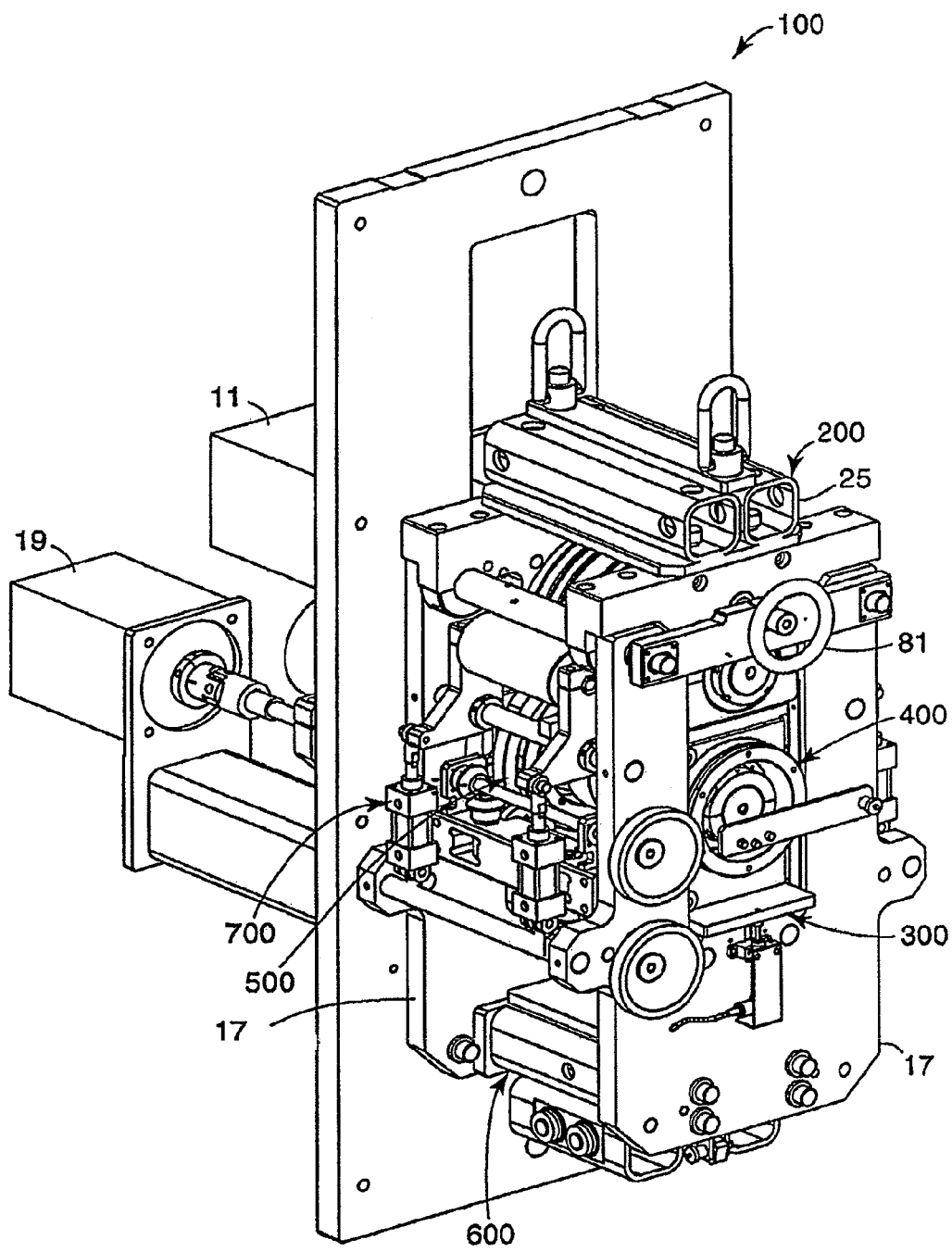
FIG. 1 is a front and right side perspective view of an exemplary rotary welding apparatus according to the present invention, the apparatus having multiple sub-assemblies.

Referring to FIG. 1, a rotary welding module 100 is illustrated. Rotary welding module 100 includes features that limit the degrees-of-freedom of the horn in relation to the anvil, thus better controlling the gap and the movement between the horn and the anvil during the welding process.

Module 100 includes a first sub-assembly, particularly an anvil assembly 200, a second sub-assembly, particularly a horn mount assembly 300, a third sub-assembly, particularly a horn assembly 400, a fourth sub-assembly, particularly a horn-anvil gap adjustment assembly 500, a fifth sub-assembly, particularly a horn lifting assembly 600, and a sixth sub-assembly, particularly a nip assembly 700. Additional details regarding each of these sub-assemblies are provided below. Also illustrated in FIG. 1 as a part of rotary welding module 100 are side plates 17, tie rods 18, a horn servomotor 19, and an anvil servomotor and gearbox 11.

Figure 2:
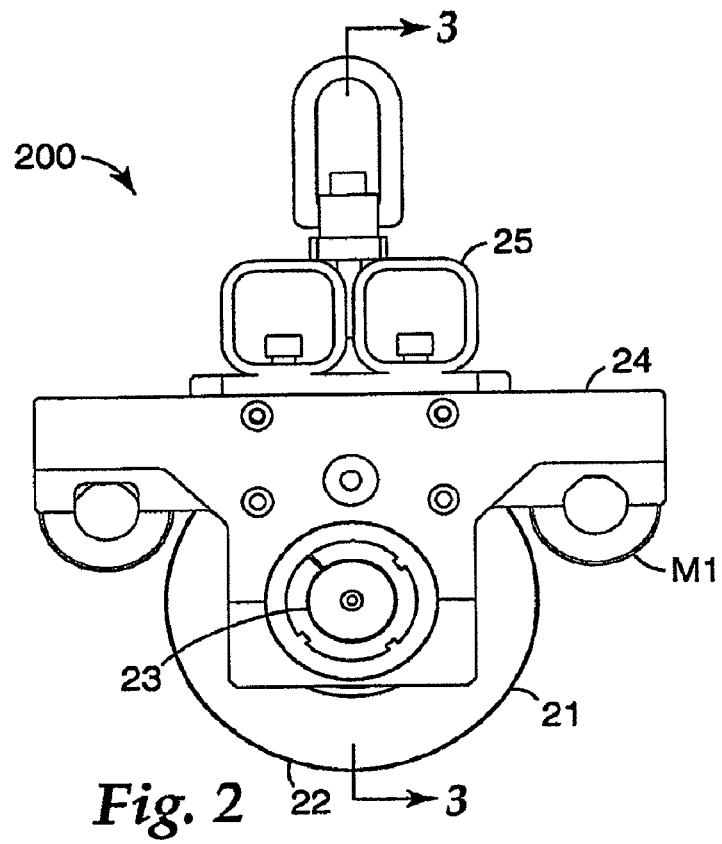
FIG. 2 is a front plan view of an anvil roll sub-assembly of the apparatus of FIG. 1.
Figure 3:
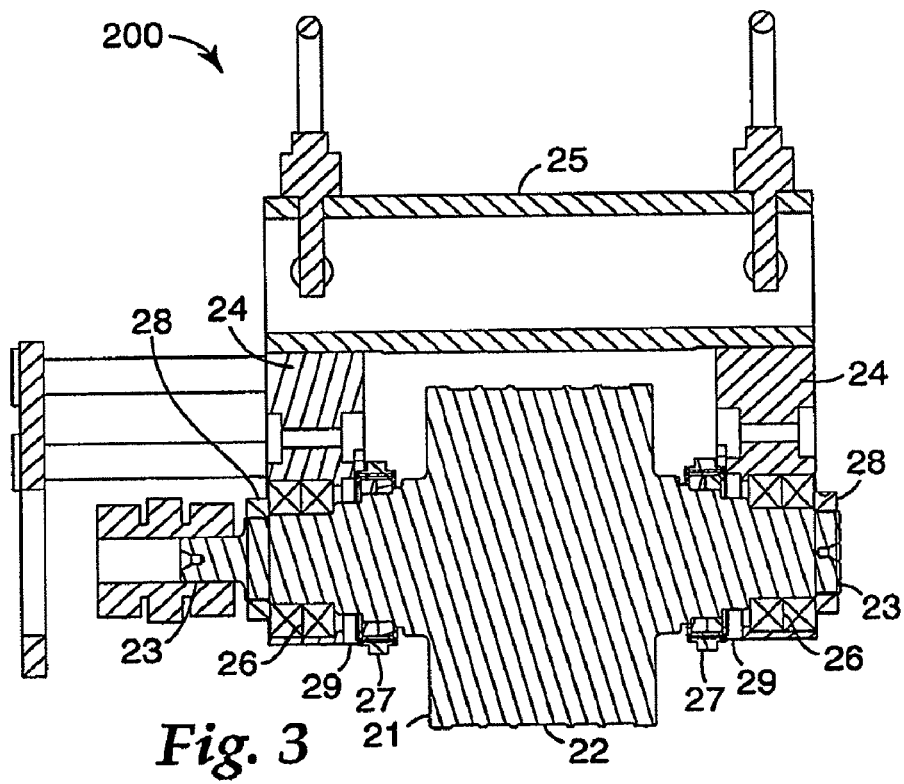
FIG. 3 is a cross-sectional view of the anvil roll sub-assembly taken along line 3-3 of FIG. 2.

FIGS. 2 and 3 provide a detailed view of anvil assembly 200. Anvil assembly 200 includes an anvil roll 21 having a roll face 22 and journals 23. Anvil roll 21 can be any suitable roll, such as a die roll, embossing roll, printing roll, or welding rolls. Anvil bearing blocks 24 are mounted to anvil frame 25. Anvil roll 21 is mounted to bearing blocks 24 using by means of precision duplex ball bearings 26. Anvil roll 21 is configured to rotate around an axis, preferably an axis extending longitudinally through the center of roll 21. Bearing locknuts 28 hold the duplex pairs 26 together and on journals 23. Anvil assembly 200 also includes two cam-follower bearing assemblies 27 mounted on anvil-roll journals 23. These cam follower assemblies 27 are held onto journals 23 using bearing locknuts 29.

Figure 6:
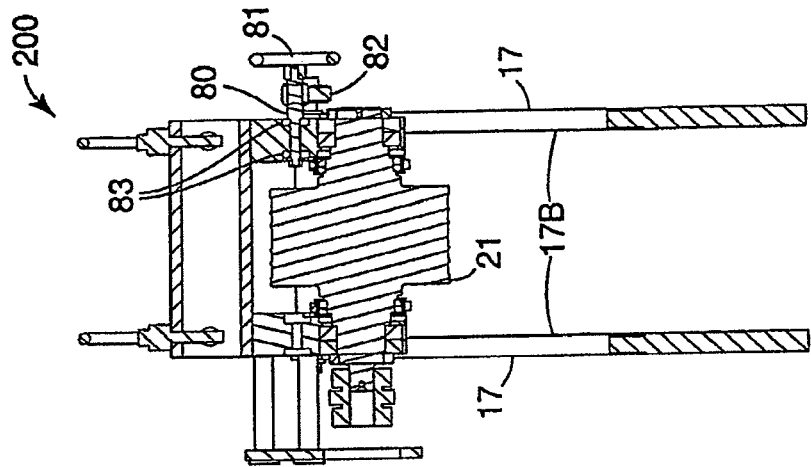
FIG. 6 is a cross-sectional view of the anvil roll sub-assembly taken along line 6-6 of FIG. 4.
Figure 5:
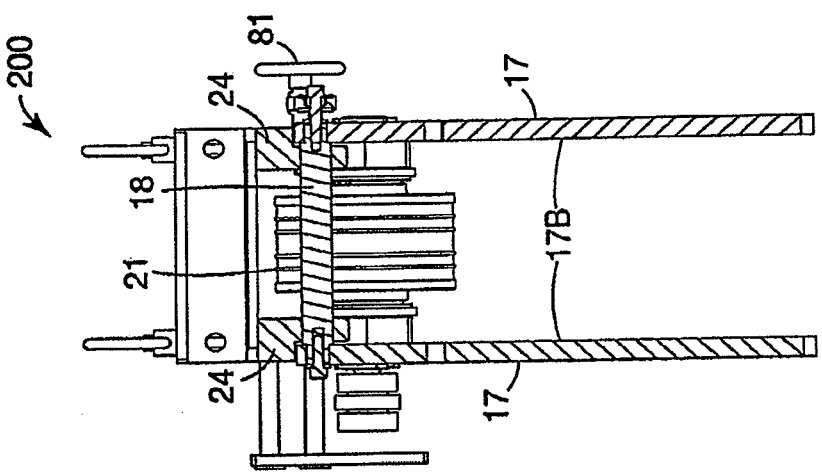
FIG. 5 is a cross-sectional view of the anvil roll sub-assembly taken along line 5-5 of FIG. 4.
Figure 4:
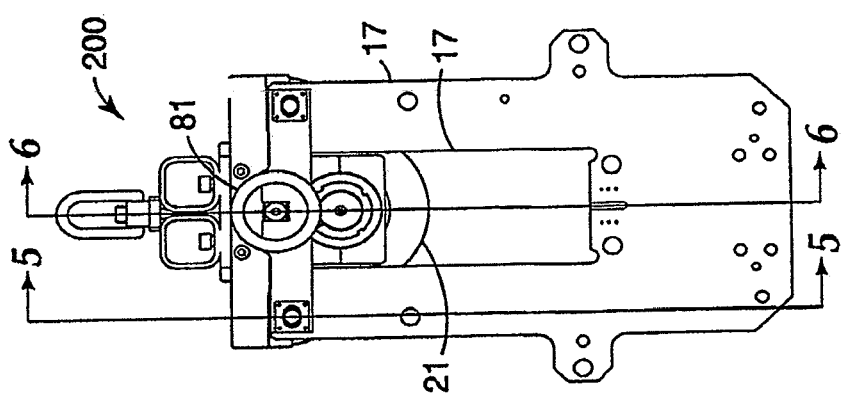
FIG. 4 is an enlarged front plan view anvil roll sub-assembly, from the same perspective as FIG. 2.

One of the features of this invention is the ability to move the anvil assembly 200 slightly cross-web; this cross-web motion is called "side-lay". Referring to FIGS. 4 through 6, additional views of anvil roll assembly 200, supported by side plates 17, are illustrated. Anvil roll 21 is mounted on tie rods 18 and to side plates 17, in a manner so that roll 21 can rotate around its longitudinal axis. In this embodiment, bearing blocks 24 are supported by tie rods 18. Anvil roll 21 is fixed to tie rods 18 by way of shaft clamps M1. When clamps M1 are in a loosened condition, anvil roll assembly 200 can be moved in relation to side plates 17, for example by using a threaded rod 80 attached to a handle 81. A threaded bar 82 is fixed to the side plates 17 and bearings 83 are attached to one of bearing blocks 24.

Figure 7:
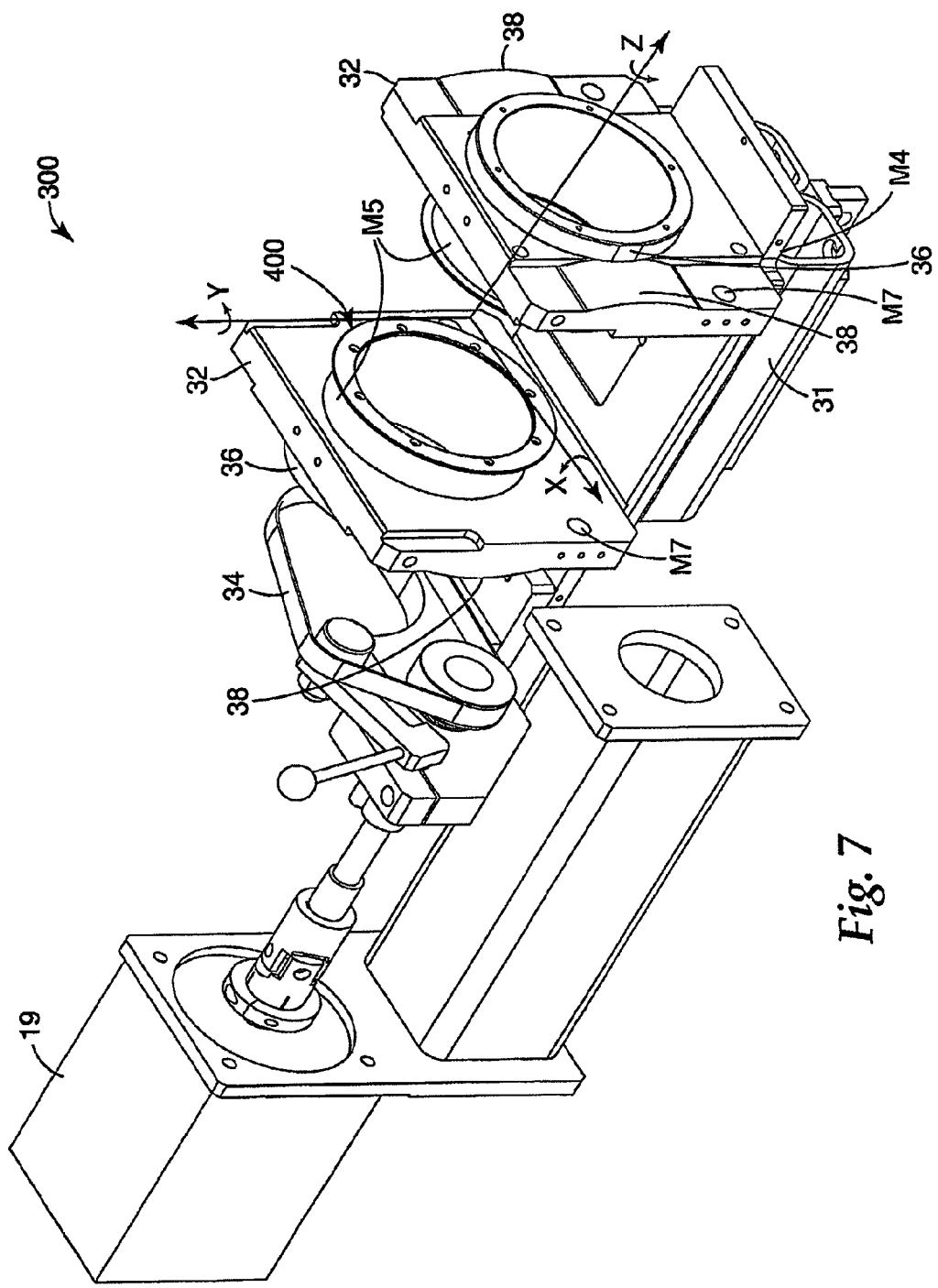
FIG. 7 is a perspective view of a horn mount sub-assembly of the apparatus of FIG. 1.
Figure 8:
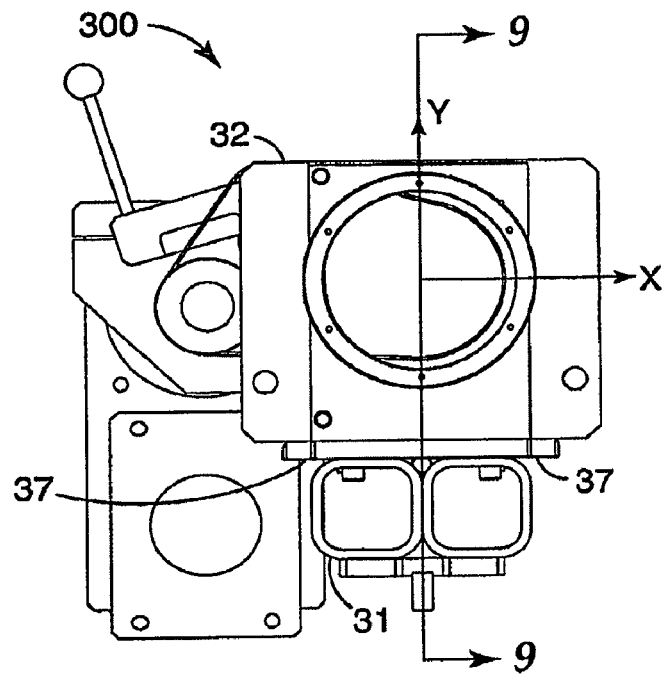
FIG. 8 is a front plan view of the horn mount sub-assembly of FIG. 7.
Figure 9:
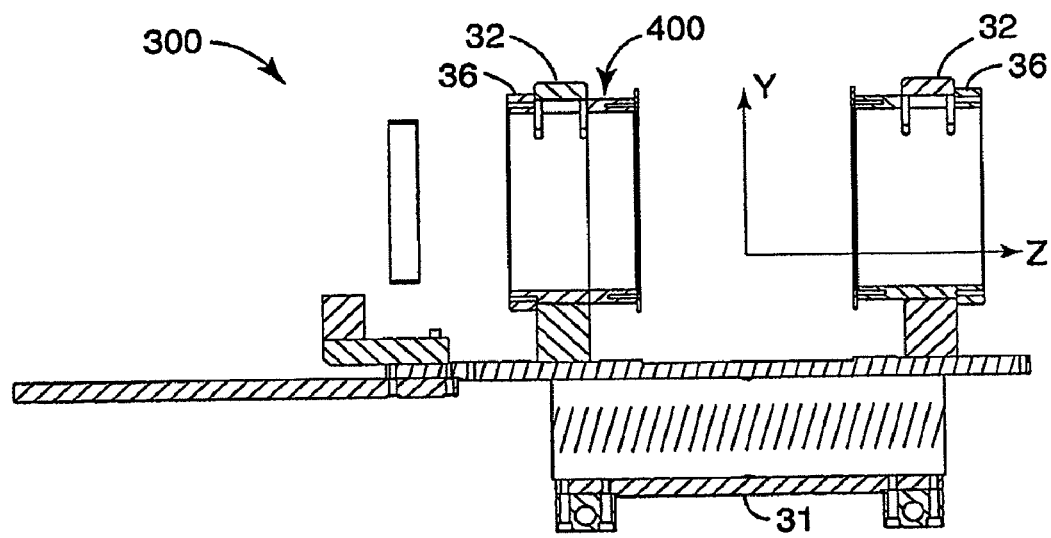
FIG. 9 is a cross-sectional view of the horn mount sub-assembly taken along line 9-9 of FIG. 8.

FIG. 7 shows horn mount assembly 300, which includes a mount frame 31, horn-bearing blocks 32, a horn drive motor 19, and a horn drive means, such as belt 34. FIGS. 8 and 9 show additional views and features of horn mount assembly 300.

Figure 15:
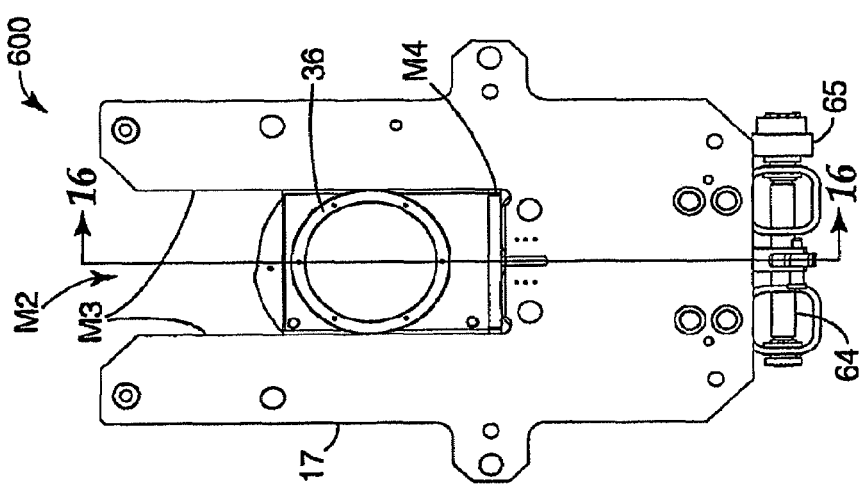
FIG. 15 is a front plan view of the horn lift sub-assembly of FIG. 14.

When horn mount assembly 300 is installed in welding module 100, slots M2 (as shown in FIG. 15) in side plates 17 as shown in FIG. 1 guide and allow horn mount assembly 300 to move. In particular, surfaces 36 on bearing blocks 32 contact surfaces M3 of side plates 17; preferably, at least a portion of bearing block 32 fits within slot M2. In some embodiments, surfaces 36 are cylindrical surfaces, though this is not essential.

Surfaces 36 inhibit movement of assembly 300 in two directions, thus removing two degrees of freedom, one linear along the X-axis and one rotational around the Y-axis (see FIG. 7). Another rotational degree-of-freedom around the Z-axis is removed by rest buttons M4 on mount frame 17.

Figure 1A:
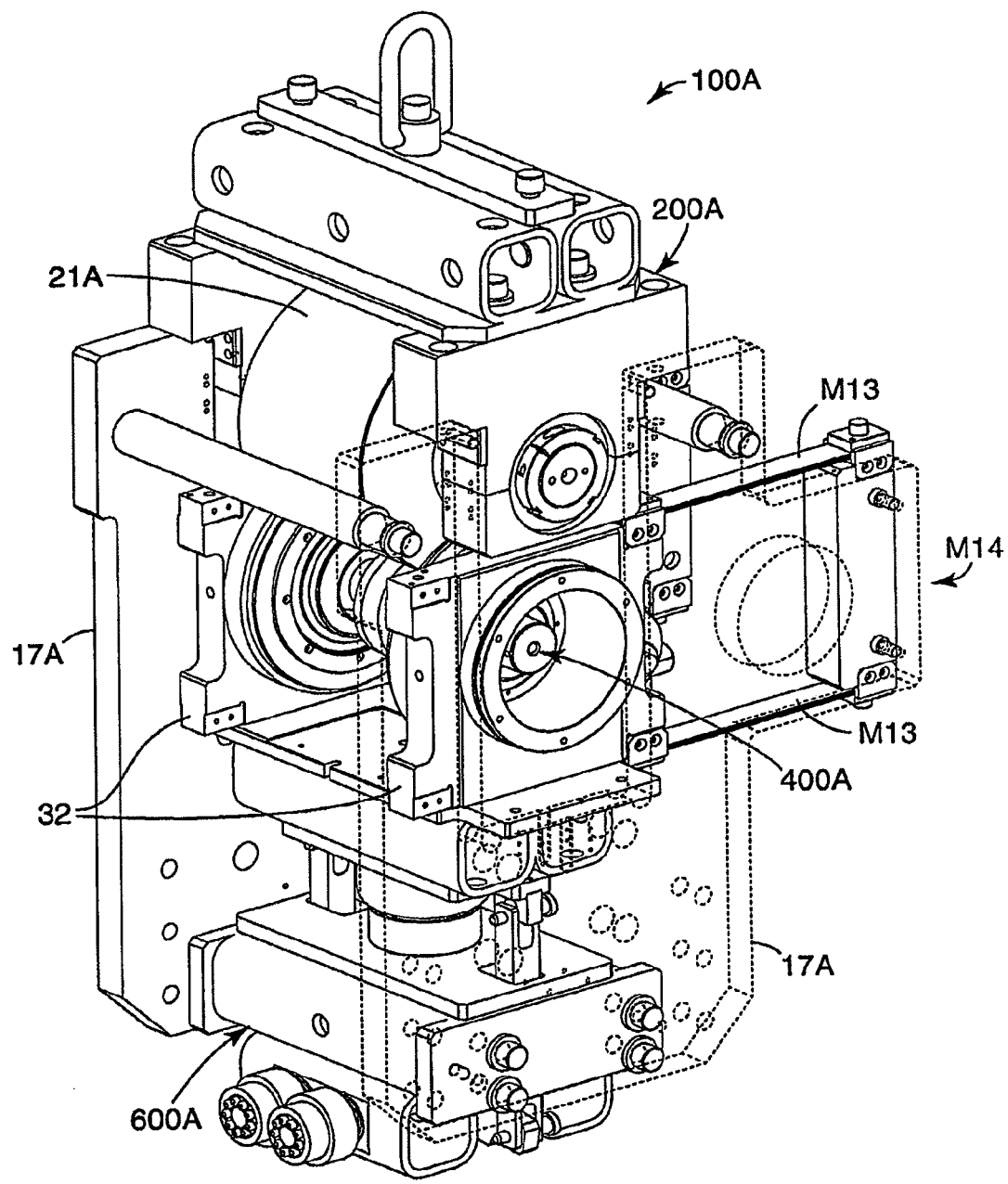
FIG. 1A is a front and right side perspective view of an alternate exemplary rotary welding apparatus according to the present invention, similar to that of FIG. 1.

Bearing blocks 32 also have a second set of surfaces 38, which also in an exemplary embodiment are cylindrical surfaces. The radius of these surfaces 38 is half the distance between the inside or bearing surfaces 17b of side plates 17 (FIG. 1A). Surfaces 38 remove a translational degree of freedom along the Z-axis.

It is well recognized that all rigid bodies have six degrees-of-freedom. The features described above remove four degrees-of-freedom.

The two remaining available degrees of freedom are translational movement along the Y-axis (towards and away from the anvil) and rotational movement along the X-axis. The combination of these two degrees-of-freedom allow the gap between horn 30 and the anvil to be adjusted independently on both sides of horn 30.

FIGS. 10 and 11 shows horn assembly 400, which includes horn 42, nodal mounts 43, horn bearing rings 44, horn bearings 45, and horn drive sprocket 46. Horn 42 and nodal mounts 43 (which are described in U.S. Pat. No. 6,786,384, to Gopal Haregoppa, which is herein incorporated by reference in its entirety) illustrated are one of several possible designs, but are preferred for this embodiment.

FIGS. 12 and 13 show horn gap or horn-anvil gap adjustment assembly 500. Assembly 500 includes first and second cams 50 and a drive gear 51 attached to the cams. The inner cylindrical surface of the cams, M6, rests on the cylindrical surfaces M5 of assembly 300 (FIG. 7). Clearance between surfaces M5 and M6 allows the cams 50 to rotate about the z-axis.

Gear shaft 53 is a non-rotating shaft that is mounted between bearing blocks 32 using holes M7 (FIG. 7). Driving gears 52 are rotatably mounted to gear shaft 53 the driving gears 52 are rotated independently using a wrench the hex feature M8 to substantially parallel the z-axis of the anvil. Rotation of the driving gears 52 causes the cams 50 to rotate.

In use, the outer cam surface 50a is machined to generate a linear function, h=Aθ, where h is the total rise of the cam, θ is the angle of rotation of the cam, and A is a constant. In a preferred embodiment, cams 50 generate a rise of 0.100 inch (about 2.5 mm) over 300 degrees of cam rotation. This provides an adjustment resolution of 3/10000 inch per degree (about 0.0076 mm per degree).

Figure 14:
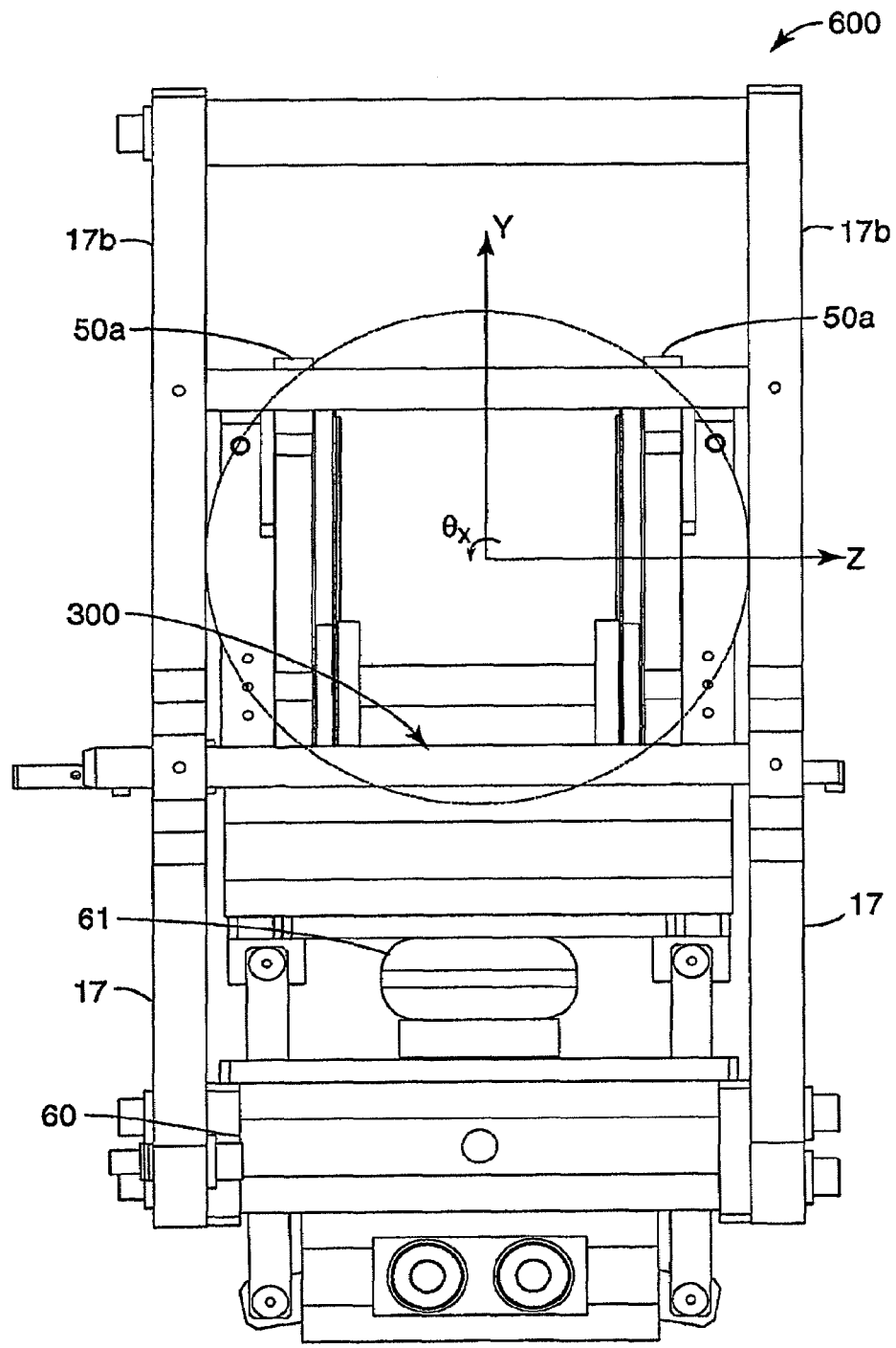
FIG. 14 is a side plan view of a horn lift sub-assembly of the apparatus of FIG. 1.

FIG. 14 shows horn lift assembly 600, which is used to move, generally raise and lower, horn mount assembly 300 in relation to side plates 17. The motion of horn mounting assembly 300 is stopped when cam surface 50a contact cam followers 27 of anvil assembly 200.

Referring to FIG. 14, horn lift assembly 600 includes lift frame 60 fixedly attached to side plates 17. Attached to lift frame 60 is pneumatic bellows 61, which is configured to expand and decrease, as desired. In use, pressurizing bellows 61 applies force to horn mount assembly 300 to push assembly 300 towards anvil roll 21; other force generators, such as linear actuators, pneumatic cylinders and hydraulic cylinders could alternately be used. As discussed previously, horn mount assembly 300 has two remaining degrees-of-freedom. One is translational along the Y axis and one rotational along the X($\theta_x$)-axis (FIG. 14).

FIGS. 15 and 16 show additional views of horn lift assembly 600. In this embodiment, a geared 7-bar linkage, with pivot clearance, is used to control the rotation of horn mount assembly 300 in relation to side plates 17 and mount frame 31. This linkage includes connecting link arms 62, pivot arms 63, pivot shafts 64, gears 65, and pivot connections 66, 67. As bellows 61 lifts horn mount assembly 300, connecting link arms 62 raise the ends of pivot arms 63, which rotate an equal amount, due to arms 63 being geared together. If there were no clearance or slop in the pivot joints 66, 67, horn mount assembly 300 would only move vertically and the rotational degree-of-freedom (θx) would be removed. However, by the inclusion of clearance to joints 66, 67, an amount of rotation is allowed.

FIG. 16A and B shows the geared 7-bar linkage 600A, along with the horn mount assembly 300 in more basic kinematic form. Referring to FIG. 16A, in this embodiment, link 1 is ground. Linkage 600A includes connecting link arms 62A, pivot arms 63A, pivot shafts 64A, and pivot connects 66A, 67A. Connecting link arms 62A raise the ends of pivot arms 63A at joint 67A, arms 63A which rotate an equal amount, due to arms 63A being geared together.

Pivot arms 63A are two binary links that are connected to ground and to link arms 62A via joints 64A and 67A, respectively. Pivot arms 63A are also connected to each other using a gear joint. The ratio of the gear joint is 1:1. Link arms 62A are also binary links that are connected to pivot arms 63A and to mount frame 31A via revolute joints 67A, 66A respectively. Mount frame 31A is a ternary link that is connected to arms 62A and slide block M11 with pivot joints 67A and M12. Slider block M11 is connected to ground and mount frame 31A using joints M10 and M12. Slider block M11 controls the motion of mount frame 31A so that mount frame 31A has only a translational and rotational degree-of-freedom.

Linkage 600A includes joint clearance at joints 66A by including an oversized hole. Additionally or alternatively, joint clearance could be present at pivot joints 67A. In a conventional geared-7-bar linkage mechanism without joint clearances, the motion of mount frame 31A would only be translational as pivot arms 63A are rotated. By having the joint clearance, the horn 42 of horn mount assembly 300, which is connected to mount frame 31A, can be adjusted with limited angular motion.

Figure 16B:
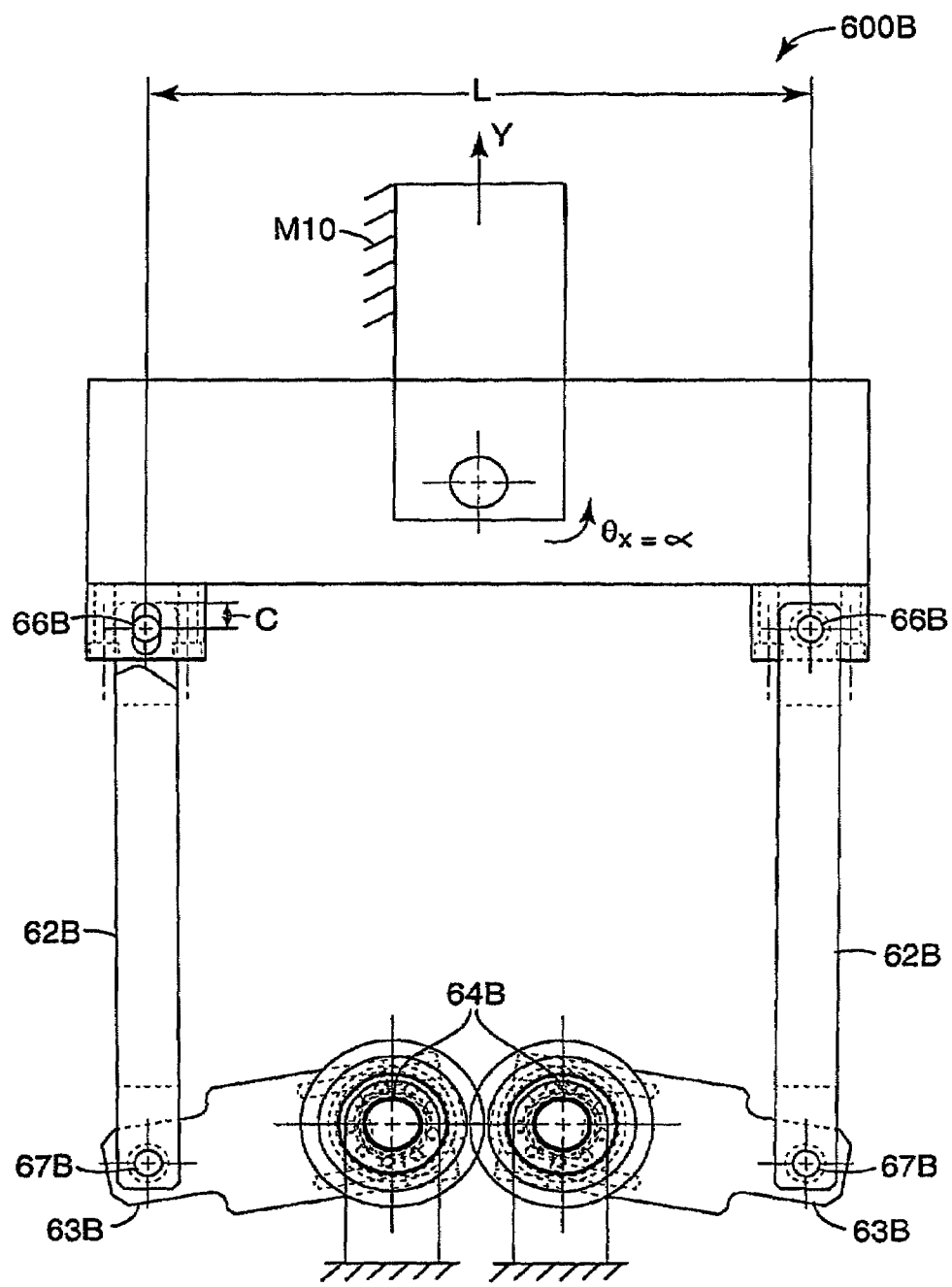
FIG. 16B is another alternate embodiment of a horn lift sub-assembly, similar to the view of FIG. 16.

The clearance in the joint may also be accomplished using clearance controls/limits angular motion θx, with the use of a slot, as is illustrated in FIG. 16B. In FIGS. 16B, linkage 600B includes connecting link arms 62B, pivot arms 63B, pivot shafts 64B, and pivot connections 66B, 67B. Pivot connections 66B include a slot that provides joint clearance. If L is the distance between joints 66B, and C is the joint clearance, then the allowed angle of rotation, α, is given by, $$\alpha = 2\sin^{-1}\left(\frac{C}{L}\right)$$

In a preferred embodiment, C is equal to 0.03 inch and L is 11.88 inch, thus providing α as 0.3 degrees.

The clearance, either an oversized hole, a slot, or other, is selected so that the rotation allows variations in the gap between horn 42 and anvil to adjust for manufacturing tolerances and process variations. The clearance is not, however, so great as to prevent or 30 inhibit mounting of horn 42 and stopping correctly on cams 50.

Figure 17:
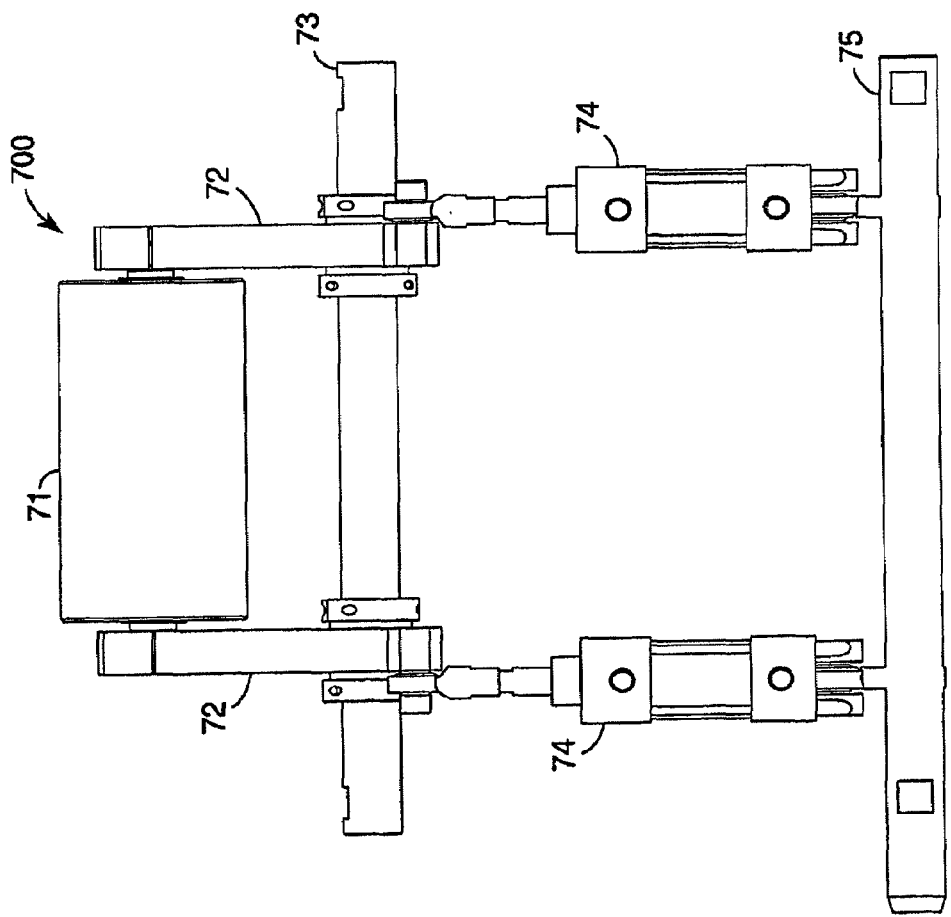
FIG. 17 is a front plan view of a nip sub-assembly of the apparatus of FIG. 1.

FIGS. 17 and 18 shows nip assembly 700. Nip assembly includes nip roller 71, nip arms 72, pivot shaft 73, nip cylinders 74, and cylinder support shaft 75.

An alternate exemplary rotary welding module is illustrated in FIG. 1A as apparatus 100A. Similar to apparatus 100 of FIG. 1, apparatus 100A has multiple sub-assemblies. Shown in FIG. 1A are anvil assembly 200A which includes anvil roll 21A, horn assembly 400A, and horn lifting assembly 600A. Also shown in FIG. 1A are side plates 17A. An alternate method of limiting the horn assembly to two degrees of freedom uses leaf springs M13 and M14. Apparatus 100A includes leaf springs M13, typically at least two pairs of leaf springs M14. Each pair of leaf springs M14 is attached to different bearing blocks 32 and different side plates 17A.

A welding apparatus, based on reducing the degrees-of-freedom available to better control the gap between the anvil and the horn, generally includes anvil roll 21 or other rotatable tool roll having an first axis, and a mounting system for supporting anvil roll 21 so that it can rotate about its first axis. The mounting system is configured such that anvil roll 21 has only two additional degrees of freedom, the first additional degree of freedom being translational motion in a direction perpendicular to the first axis, and the second additional degree of freedom being rotational motion about a second axis that is both perpendicular to the first axis and the direction of the first additional degree of freedom. This limited range of movement stabilizes the distance between the anvil and the horn.

Upon reading and understanding the foregoing process for controlling an ultrasonic welding system, one of ordinary skill in the art will appreciate that gap control for a system can be achieved by measuring the operating frequency of the horn, and then adjusting the force, for example, pressure, that controls the gap. The specific equations can be derived or determined empirically for any horn geometry, including linear and rotary horns.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed:

1. An apparatus for contacting a web of indefinite length, comprising:
    a frame include a pair of opposed side plates;
    a rotatable anvil supported by the side plates, wherein the anvil has two degrees of freedom including rotation about a rotational axis of the anvil and a lateral position adjustment of the anvil relative to the side plates;
    a rotatable horn supported by a horn mount that is slidably connected to the side plates, wherein the horn has three degrees of freedom including rotation about a rotational axis of the horn, translational movement towards or away from the anvil, and a tilt adjustment towards or away from the anvil;
    a horn lift assembly for driving the translational movement of the horn and for setting the tilt between the horn and anvil including;
    a pair of link arms pivotally connected to the horn mount, wherein at least one connection point between the link arms and the horn mount is adjustable for adjusting the tilt of the horn relative to the anvil;
        a pair of gear together pivot arms connected to the link arms,
        a pair of pivot shafts connected to the frame and the pivot arms,
    wherein when a force generator is actuated the pair of link arms raise the pair of pivot arms causing the translational movement of the horn towards or away from the anvil.

2. The apparatus according to claim 1 wherein the force generator is selected from the group consisting of air bellows, linear actuators, pneumatic and hydraulic cylinders.

3. The apparatus according to claim 1 further comprising a frequency sensor positioned to provide a signal based on the frequency of the ultrasonic energy, wherein
    the horn lift assembly adjusts the distance between the anvil and the horn in a predetermined way based on the signal.

4. The apparatus according to claim 1 wherein a pair of support elements each adapted to engage the horn in such a fashion that the horn is free to rotate, and
    at least two pairs of leaf springs, each pair of leaf springs attached to a different one of the support elements and a different one of the side plates.

5. The apparatus according to claim 1 wherein each side plate includes a bearing surface and having a slot therein,
    a pair of support elements each adapted to engage the horn in such a fashion that the horn is free to rotate, wherein each support element comprises
    a slide portion slidably engaging one of the slots, and
    a bearing portion having a curved surface engaging the bearing surface.

6. The apparatus according to claim 5 wherein the curved surface has at least one portion that is a sector of a cylinder.

7. The apparatus according to claim 5
further comprising:
    a first pair of bearing rings mounted on the anvil; and
    a second pair of bearing rings, each one of the second pair of bearing surfaces being mounted on one of the support elements, such that
    each one of the first pair of bearing rings can contact one of the second pair of bearing rings in such a manner as to limit the minimum distance between the anvil and the horn.

* * * * *

UNITED STATES PATENT AND TRADEMARK OFFICE
CERTIFICATE OF CORRECTION

PATENT NO. : 7,690,548 B2  Page 1 of 1
APPLICATION NO. : 11/321265
DATED : April 6, 2010
INVENTOR(S) : John R. Mlinar It is certified that error appears in the above-identified patent and that said Letters Patent is hereby corrected as shown below:

On the First Page, in Column 1, under (Title)
Line 1, delete "OF" and insert -- FOR --, therefor.

Column 1
Line 1, delete "OF" and insert -- FOR --, therefor.

Signed and Sealed this

Fifteenth Day of June, 2010

David J. Kappos
*Director of the United States Patent and Trademark Office*